July 27, 1965  H. A. NELSON  3,197,052

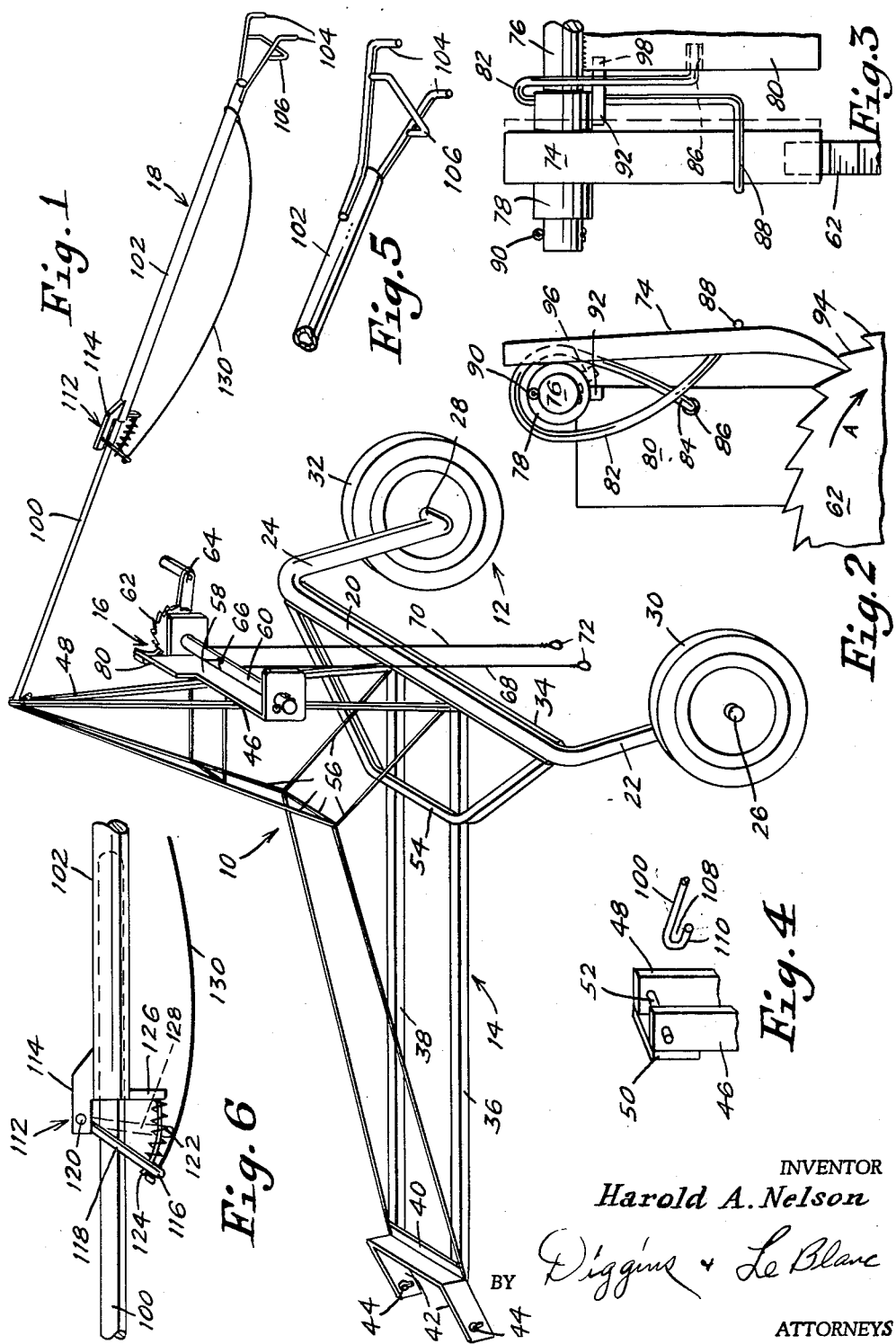

LIFTING AND TRANSPORTING DEVICE

Filed April 27, 1962  2 Sheets-Sheet 2

INVENTOR
Harold A. Nelson
BY Diggins + Le Blanc
ATTORNEYS

United States Patent Office 3,197,052
Patented July 27, 1965

3,197,052
LIFTING AND TRANSPORTING DEVICE
Harold A. Nelson, Nicollet, Minn.
Filed Apr. 27, 1962, Ser. No. 190,533
6 Claims. (Cl. 214—394)

This invention relates to a lifting and transporting device and more particularly to a lifting and transporting device for use with farm instruments of the corn sheller dragline type.

In the transporting of various objects and especially long and bulky farm machinery such as, for example, corn sheller draglines, it has heretofore been necessary to first disassemble the machinery and then load it piece by piece on some transporting device such as a truck or wagon for movement to its new place of operation. Once the object or machinery has been transported to the location where it is next to be placed in operation it must be unloaded and reassembled. Needless to say, not only does this assembling and disassembling process require the use of special tools and skilled personnel who know the correct sequence of steps for assembling and disassembling the particular machinery, but it also requires a considerable amount of time which, in the case of even relatively simple farm instruments such as corn sheller draglines, may exceed an hour with considerably more time being required for more complex machinery.

Various types of "tow trucks" or transporting devices have been posed for moving different types of farm machinery from one place of operation to another but none have proved very successful. Perhaps the most common of these tow trucks or transporting devices is the so-called dolly which has a plurality of wheels attached thereto and is designed to be placed under the middle or rear end portion of a farm instrument for carrying it behind a tractor or other suitable pulling vehicle. The use of such a dolly is limited since it not only requires that the farm machinery be lifted onto it, which in many instances is extremely difficult if not impossible due to the weight or shape of the machinery, but that the farm instrument or machinery be sufficiently rigid in construction so as to carry that portion of its own weight which extends from either side of the dolly. In the case of relatively long farm machinery, such as the corn sheller dragline previously mentioned, these dolly carrier devices cannot be used because the machinery is not constructed in such a manner as to carry its own weight when draped across such a carrier.

According to the present invention it has been found that a transporting device may be constructed which overcomes these above mentioned difficulties by providing a two-wheel trailer-like device which can be readily attached to and will lift long, heavy and bulky farm instruments or machinery in a minimum amount of time and with no special tools or lifting devices being required. To assure that no undue weight or strain is placed on the machinery being moved and to facilitate the connecting and transporting of the instrument, a plurality of extended support arms are attached from the transporting device to the middle and rear end of the machinery.

It is, therefore, a primary object of this invention to provide a lifting and transporting device that will accommodate loads of extreme weight and length.

Another object of this invention is to provide a lifting and transporting device which can be readily attached to farm machinery without the use of special tools or devices.

Yet another object of this invention is to provide a lifting and transporting device for extremely long instruments having a plurality of extended arms which support a portion of the weight of the instrument.

Yet still another object of this invention is to provide a lifting and transporting device which is especially adapted for lifting and transporting a corn sheller dragline.

A further object of this invention is to provide a lifting and transporting device having the above described desirable characteristics yet which is extremely light, compact and inexpensive to construct and operate.

These and further objects and advantages of this invention will become more apparent upon reference to the following specification, claims and appended drawings wherein:

FIGURE 1 is a perspective view of the lifting and transporting device in the position it assumes when an object has been lifted and is ready to be transported;

FIGURE 2 is a right hand end view of the locking device for the hoist or winch arrangement used in lifting the object to be transported;

FIGURE 3 is a side view of the locking device shown in FIGURE 2;

FIGURE 4 is an elongated view of the hook arrangement used to secure an adjustable support arm to the transporting device;

FIGURE 5 is an elongated view of the free end of an adjustable support arm;

FIGURE 6 is an elongated view of the clamp arrangement used in the adjustable support arm;

Figure 8:
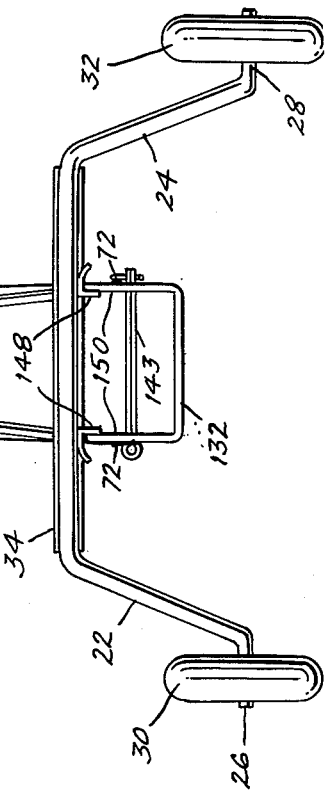
FIGURE 8 is a cross sectional view taken through the corn sheller dragline as it is held in a transporting position.

With continued reference to the accompanying drawings wherein like reference numerals designate similar parts throughout the various views, and with initial attention directed to the embodiment of the invention as shown in FIGURE 1, reference numeral 10 is used to generally designate a corn sheller dragline transporting truck constructed in accordance with the concepts of the present invention. The improved transport truck of this invention comprises, in general, a high speed, heavy duty wheel assembly and axle 12, a horizontal attaching and supporting frame 14, a hoist or winch arrangement 16 and an adjustable rear end supporting arm 18.

A high speed, heavy duty wheel assembly 12 comprises a U shaped axle arrangement consisting of a cross member 20 and two parallel legs 22 and 24 which extend downwardly at substantially right angles from the cross member 20. The end of each leg is provided with an axle surface 26 and 28 which extend outwardly at a right angle from the legs. A wheel 30 and 32 is mounted upon each of the axle surfaces 26 and 28, respectively, by extending the axles through the bearing surface of each wheel.

A L shaped angle iron piece 34 is rigidly secured along the cross member 20 as shown in FIGURE 1 by any suitable method such as welding, brazing or by using bolts. Extending at a right angle from the piece 34 is a pair of parallel spaced, horizontal attaching bars 36 and 38. These bars may also be formed of an L shaped iron piece and each bar has their right end rigidly secured to the angle iron piece 34. The extreme left hand end of the bars 36 and 38 are securely attached to an L shaped tie plate 40 by any suitable means such as welding. As seen in FIGURE 1, the tie plate 40 is provided with a pair of parallel plates 42 which may be formed as an integral part of the plate 40 or welded thereto, whichever is more desirable. Each plate extends slightly downward from the plate 40 and is provided with key hole shaped apertures 44 for facilitating the attaching of the plates to a corn sheller dragline as will be more fully explained hereinafter.

The hoist or winch arrangement 16 is supported substantially directly above the wheel assembly 12 by means of a pair of support members 46 and 48. Each member 46 and 48 is rigidly attached to the iron piece 34 at the point where the bars 36 and 38 meet the piece 34. As more clearly seen in FIGURE 8, the support members taper inwardly toward their upper ends and are drawn together in a spaced manner by a metal plate 50 (FIGURE 4). A bolt or pin 52 is connected through the upper ends of the support members 46 and 48 for receiving one end of the supporting arm 18 as will be more fully explained hereinafter.

To increase the rigid construction of the various bars and the ends of the cross piece 34, a bent cross bracing 54 is secured to each end of the piece 34 and to the bars 36 and 38. A plurality of rod like braces 56 are also connected between the ends of the bars 36–38 and the support members 46–48 and are joined at substantially their mid-points to the cross piece 34 thus substantially increasing the rigid construction of the truck.

The winch assembly 16 comprises a substantially U shaped metal plate 58 through which extend a shaft 60 in the manner shown in FIGURES 1 and 8. A ratchet wheel 62 is rigidly connected to the right hand end of the shaft 60 and is provided with a handle 64 for rotating the shaft and ratchet wheel. A bolt or other suitable fastening device 66 is passed through the shaft 60 at substantially its mid point for receiving and securing the ends of steel cables 68 and 70 to the shaft so that rotation of the shaft will result in the cables simultaneously being wound upon the shaft. Each free end of the steel cables 68 and 70 is provided with a loop or eyelet 72 for connecting the cables to a corn sheller dragline as will be more fully explained hereinafter.

In reference to FIGURES 2 and 3, the ratchet wheel locking device is shown in more detail and comprises a locking dog 74 which is rotatably mounted upon a pin or shaft 76 by means of a slidable collar or sleeve 78. The pin or shaft 76 is welded or otherwise securely mounted on a locking plate 80. A looped spring 82 is placed around the pin 76 and has one end 84 secured to the plate 80 by any suitable means such as aperture 86 while the other end 88 of the spring is bent over the locking dog 74. A cotter key or locking pin 90 is provided in the end of the pin 76 for preventing the slidable collar 78 from sliding off the end of the pin. Welded to or formed as an integral part of the slidable collar 78 is a locking rod 92 which extends to the right past the end of the sleeve 78 as viewed in FIGURE 3.

As is readily apparent, as the handle 64 is turned in a clockwise direction, the ratchet wheel 62 will rotate in the direction of the arrow A with the free end of the locking dog 74 being successively engaged in the teeth 94 of the wheel thus preventing the wheel from rotating in a counter clockwise direction when the handle 64 is released. When, however, it becomes desirable for the shaft 60 to rotate counter clockwise thereby allowing the steel cables to unwind, as would be the case when the farm machinery is to be lowered to the ground, the locking dog 74 is rotated slightly in a counter clockwise direction until the free end of the locking rod 92 is moved past the edge of the locking plate 80 as indicated by the broken line 96 in FIGURE 2. The locking dog 74 is now pushed to the right until the free end of the locking rod 92 is moved past the edge of the locking plate 80 and into the position indicated by the broken line 98. The locking dog 74 will now be held from engaging the teeth 94 of the ratchet wheel thus permitting the steel cable 68 and 70 to unwind from the shaft 60 when the handle 64 is released.

To support that portion of the farm machinery which extends beyond the rear of the truck 10, an adjustable or telescoping rear end supporting arm 80 is attached to the top of the support members 46 and 48. This adjustable supporting arm 18 comprises a rod 100 slidably mounted within a tubular member 102 which has a pair of catches 104 formed on the free end thereof as seen in FIGURE 5. These catches can be formed of tubular pipes or like members which are welded to the tubular member 102. To brace the catches, a U shaped metal brace 106 is welded between each catch 104.

As seen in FIGURE 4, the free end of the rod 100 is bent to form a hook 108 which is secured over the bolt or pin 52. To assure that the hook 108 does not become disengaged from the bolt 52 during use, the end 110 of the hook is made sufficiently long so that the rod 100 can be inserted or removed from the bolt only by lowering the right hand end of the arm 18. Therefore, the hook 108 when moved to the left while the arm is in a raised position will engage against and be stopped by the plate 50 while the end 110 is still hooked over the bolt 52.

To facilitate the adjustment of the length of the arm 18, a catch arrangement 112 is provided which will permit the rod 100 to slide into the tubular member 102 but will prevent the rod from sliding out of the member unless the catch is released. The catch arrangement 112 as shown in FIGURE 6 comprises a pivot plate 114 which is welded or otherwise securely attached to the tubular member 102. A swinging plate 118, containing an aperture 119 through which rod 100 projects and an aperture 116, is pivotally attached at 120 to the pivot plate 114 and is biased to the left by a coiled spring 122. The coil spring 122 is positioned around a curved rod 124 which is held by a plate 126 attached to the tubular member 102 so that the curved rod not only holds the spring in place but also by projecting through aperture 116 acts to guide the swinging plate 118 when it moves to the right as indicated by the dotted line 128. A rope or cable 130 is provided for operating the swinging plate 116 from the extreme right hand end of the arm 18.

Figure 7:
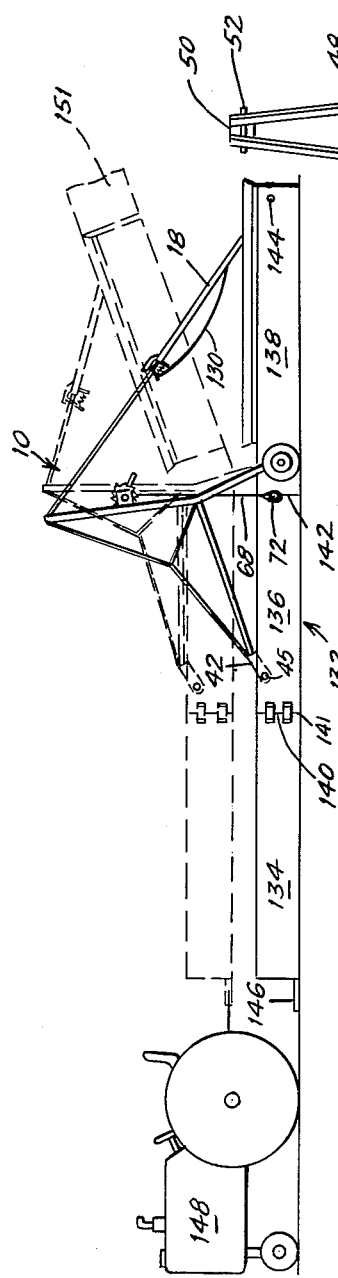
FIGURE 7 is a side elevation diagrammatical view of the transporting device in position for lifting a corn sheller dragline.
Figure 9:
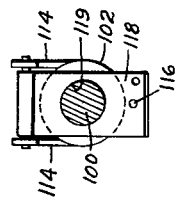
FIGURE 9 is an end view of the clamp arrangement used in the adjustable support arm pictured in FIGURE 6.

In reference to FIGURES 7 and 8, the transporting truck 10 of this invention is shown being used to lift and transport a relatively long, bulky and heavy corn sheller dragline. As is the normal practice, the dragline is formed in three sections, 134, 136, 138, held together at pivot joints 140 and 142 so that the dragline can be disassembled and loaded into a vehicle for transporting from place to place. However, such disassembling is not necessary when a transporting truck constructed in accordance with this invention is used.

To use the transporting truck 10 it is only necessary to place the truck over the dragline 132 by pulling one wheel of the truck across the dragline. Joint 140 is made rigid by brackets 141 bolting together sections 134 and 136, while pivot joint 142 is allowed to remain pivotable. The plates 42 are now attached to the walls of section 136 of the dragline by passing a bolt or pin through the apertures 45 in the walls of section 136 and the key hole shaped apertures 44 in the plate. The shape of the aperture 44 speeds this operation and also permits the attachment to be made when the dragline and truck are setting on uneven surfaces.

Figure 10:
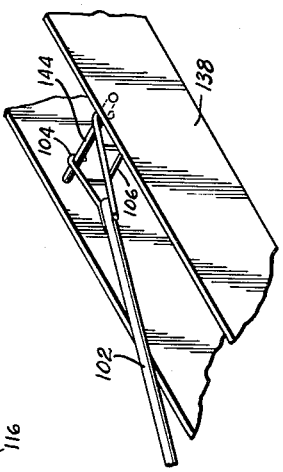
FIGURE 10 is a perspective view of the end of an adjustable support arm connected to the end section of a corn sheller dragline.

With the plates 42 attached to the dragline 132, the loops 72 in the steel cables 68 and 70 are now attached over a pin 143 which passes through section 136 as seen in FIGURE 8. Rod 100 is then inserted into tubular member 102 through aperture 119 in swinging plate 118. Hook 108 is connected to bolt or pin 52, and catches 104 as shown in FIGURE 10 are placed or hooked over pin 144 in section 138. The winch 16 is now operated to lift the dragline from the ground and to swing it into a carrying position under the truck 10. The far right end of member 138 can also be lifted pivoting about joint 142 and pin 143 to any height desired for either transporting it or connecting it to a cornsheller. Since spring 122 forces swinging plate 118 forward or to the left, upon release of the far right end of section 138 the inside walls of aperture 119 frictionally engage rod 100 preventing its outward extension and locking it in the position shown in FIGURE 7. The fact that the rear end section 138 of the dragline can be precisely adjusted to any desirable angle by means of the adjustable arm 18 is extremely important as this permits the dragline to be connected to the remaining portion of the corn sheller such as the rear elevator portion 151 without any additional lifting or holding being required as has heretofore been necessary. The left hand end of the dragline is now attached by a drawbar 146 to a pulling vehicle 148 such as a tractor. The corn sheller dragline is now in position for transporting to its next place of operation with the complete hook up time taking less than 1 minute.

To prevent the dragline from swinging from side to side during its movement a pair of curved plates 148 are welded to the piece 34 as shown in FIGURE 8. When the dragline 132 is lifted into place the walls 150 of the dragline will engage against the plates 148 and thus prevent any movement of the dragline from side to side.

In order to release catch arrangement 112 section 138 is pivoted upward about joint 142 and pin 143, the rope or cable 130 is pulled to the right so as to place swinging plate in the position of dotted line 128 and by maintaining swinging plate 118 in this position section 138 may be lowered and stopped at any position by releasing rope or cable 130 which will allow swinging plate 118 to move back to the left.

From the foregoing it will be apparent that a transporting truck constructed in accordance with this invention is simple, easy to use, troublefree and will eliminate the necessity of disassembling and assembling farm machinery every time it is desirable to change its operating position thus substantially increasing the speed with which the machinery can be transported from place to place. Furthermore, little or no manual lifting or carrying of the farm machinery is required thereby permitting machinery that was heretofore too heavy to be moved as a unit to be transported without being disassembled.

Although this invention has been described in relationship to its use in lifting and transporting farm equipment such as a corn sheller dragline, it is to be realized that it can be used to move practically any load and especially those of a long, bulky and somewhat fragile nature.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A truck for lifting and transporting an elongate load comprising a cross member, leg members connected to each end of said cross member and extending downward therefrom, axle means secured to the end of said leg members, a wheel mounted upon each axle means, a pair of horizontal supporting members secured at one end to said cross member, a tie plate secured to the other end of said pair of horizontal supporting members, parallel plates attached to and extending from said tie plate for connecting said horizontal supporting members to said load, a pair of vertical mounting members secured at one end to said cross member, bolt means secured to the other ends of said vertical mounting members, a winch secured to said vertical mounting members, cable means secured to said winch for lifting said load into a transporting position, an adjustable arm detachably secured at one end to said bolt means, attaching means mounted on the other end of said adjustable arm for holding one end of said load in a raised position, and releasable catch means connected intermediate the ends of said adjustable arm for adjusting the length of said arm thereby adjusting the position of said one end of said load.

2. A truck according to claim 1 wherein curved plate means are rigidly secured to said cross member for preventing lateral movement of said load when it is in a transporting position.

3. A truck for lifting and transporting an elongate load comprising a cross member, leg members secured to each end of said cross member and extending downward therefrom, axle means secured to the end of said leg members, a wheel mounted upon each axle means, a pair of horizontal supporting members secured at one end to said cross member, a tie plate secured to the other end of said pair of horizontal supporting members, parallel plates attached to and extending downward from said tie plate for connecting said horizontal supporting members to said load, a curved brace member connected between each end of said cross member and said supporting members for providing rigidity between said members, a pair of vertically extending mounting members secured at one end to said cross member, said mounting members converging at their other end, plate means connecting said other ends of said mounting members together in a spaced relationship, pin means extending between said other ends of said mounting members, a winch secured to said mounting members, cable means secured to said winch for lifting said load into a transporting position between said wheels, a rod having a hooked end connected over said pin means, a tubular member slidably mounted over the other end of said rod, a releasable catch mounted on said tubular member for holding said rod within said tubular member in an adjusted relationship determined by the length of the load and attaching means mounted on said tubular member for holding one end of said load in a raised position.

4. A truck according to claim 3 wherein said winch comprises a rotatably mounted shaft to which said cable means are secured, a ratchet wheel secured to said shaft, a crank mounted to said shaft, and lock means for engaging with said ratchet wheel for preventing rotation of said wheel in a first direction, said lock means including a slidable catch for holding said lock means out of engagement with said ratchet wheel thereby permitting said wheel to rotate in a second direction.

5. A truck according to claim 4 wherein said releasable catch comprises a plate having an aperture therein through which said rod passes, said plate having one end thereof rotatably mounted on said tubular member, a spring biasing the other end of said plate into a first position in engagement with said rod for preventing said rod from sliding out of said tubular member, and means for moving said plate into a second position out of engagement with said rod whereby said rod is free to slide out of said tubular member.

6. A truck for lifting and transporting an elongate load comprisinig an inverted U-shaped frame and wheel assembly, load supporting frame means secured to said assembly and extending in a forward direction therefrom, connection means on the forward terminus of said supporting frame for detachable securement to the load toward one end thereof, a substantially vertical frame secured to and extending upwardly of said assembly, a winch mounted on said vertical frame, means forming a part of the winch for detachable attachment to said load intermediate its ends, rearwardly extending, adjustable length arms carried by said vertical frame, and means carried by the rearward terminus of said arm means for detachable securement to the load toward the other end thereof.

References Cited by the Examiner

UNITED STATES PATENTS

| | | | |
|---|---|---|---|
| 2,576,048 | 11/51 | Schum | 214—373 |
| 2,606,001 | 8/52 | Lepper | 214—394 X |
| 2,757,811 | 8/56 | Rhodes | 214—373 |

FOREIGN PATENTS 1,189,326  10/59  France.

HUGO O. SCHULZ, *Primary Examiner.*

GERALD M. FORLENZA, *Examiner.*